May 9, 1933.   N. SULZBERGER   1,908,573
DEFROSTING MECHANICAL REFRIGERATORS AND THE LIKE
Filed Sept. 24, 1931
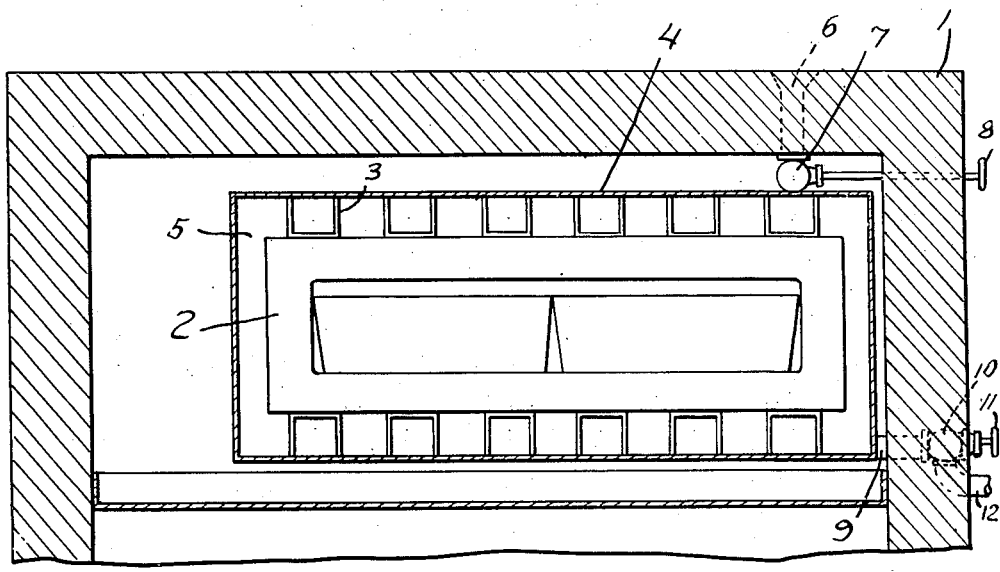
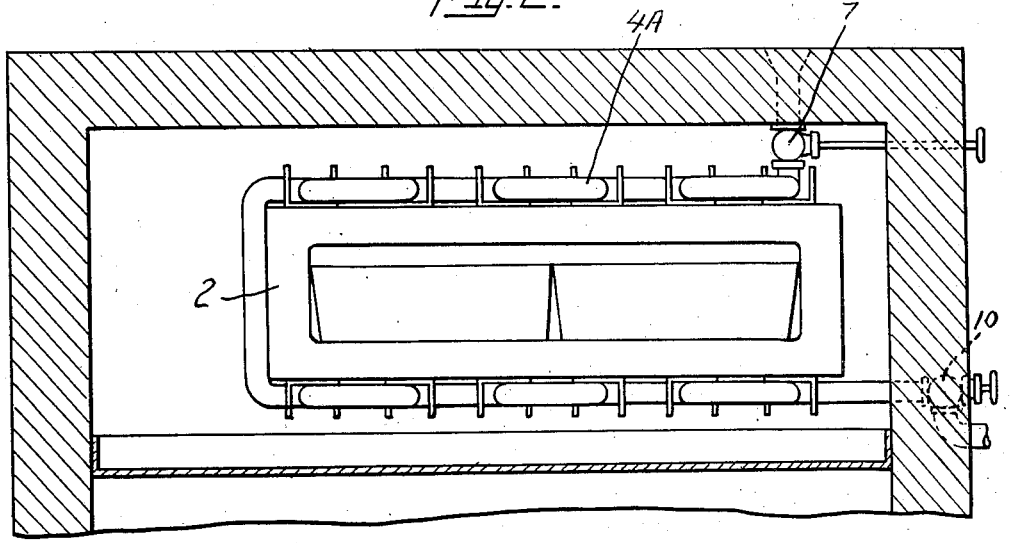
Nathan Sulzberger
INVENTOR Patented May 9, 1933

1,908,573

UNITED STATES PATENT OFFICE

NATHAN SULZBERGER, OF NEW YORK, N. Y.

DEFROSTING MECHANICAL REFRIGERATORS AND THE LIKE

Application filed September 24, 1931. Serial No. 564,954.

This invention relates to refrigerators and particularly mechanical refrigerators of the electric and gas type now extensively used in private homes for the preservation of foods and for the formation of ice cubes.

Such refrigerators commonly comprise a food containing compartment and a chilling unit, which is either located within the food compartment or else in a compartment which communicates with the food containing compartment. In use, moisture in the air condenses on the chilling unit forming frost or ice. This lowers the moisture content of the air and permits it to take up more moisture from the foods within the refrigerator. Thereupon, further condensation on the chilling unit and the formation of more frost or ice takes place. This formation of frost or ice on the chilling unit acts more or less as an insulator, and as the formation of frost and ice accumulates, the efficiency of the chilling unit is gradually reduced.

In order that the efficiency of the chilling unit may be maintained and the temperature of the food compartment kept sufficiently low, it is the present practice to de-frost or de-ice the chilling unit when a substantial coating of frost or ice has formed thereon. This is commonly done by stopping the refrigeration for a sufficient period of time to permit the temperature of the box to rise sufficiently to melt the frost or ice from the chilling unit. This method of de-frosting or de-icing the chilling unit requires a substantial period of time during which no refrigeraton is taking place. This endangers the safe-keeping of foods in the refrigerator and frequently results in the spoilage of more perishable foods. This method of de-frosting the chilling unit also produces large amounts of water which frequently overflow the drip pans provided for the purpose of catching such water, and get into the foods within the food compartment, or else accumulates in the bottom of the refrigerator necessitating the cleaning out of the refrigerator.

I have found that the disadvantages accompanying the removal of the ice by gradually melting it from the outside can be eliminated by applying the heat necessary for the removal of the frost or ice from the inside, that is, by warming the surface on which the deposit of frost or ice takes place sufficiently to cause it to loosen and fall off. To this end, I provide the chilling unit with a jacket or mantle which extends over and is spaced from practically the entire chilling unit except that portion through which the ice trays are removed. The surrounding jacket may be formed integrally with the chilling unit, or if desired, it may be made as a separate unit to be attached to the chilling unit. By making the jacket as a separate unit, it may be applied to the chilling units of existing refrigerators. The surrounding jacket may be of any desired shape and it may be smooth or otherwise, as desired.

When the chilling unit is thus provided with such a surrounding jacket, the frost or ice will accumulate on the jacket and not on the chilling unit proper. When it is then desired to de-frost or de-ice the refrigerator, it is only necessary to heat up the surrounding jacket sufficiently to cause the frost or ice to loosen, when it will fall off into the catch-pan in relatively large pieces. This may be done without even discontinuing the refrigeration.

The heat for warming the jacket may be applied in various ways and through various mediums. If it is desired to use water as the heating medium, the space between the mantle and the chilling unit may be placed in communication with a supply of water, either warm or cold, from a faucet or tap whereby a stream of water may be continually passed through the space between the surrounding jacket and the chilling unit. If the refrigerator is already connected with the source of water supply, as is commonly done with refrigerators of the gas type, a suitable connection may be made between the water pipes within the refrigerator and the space between the chilling unit and the jacket. In such a case, it is preferable to have the water pass through the space after it has passed through the condenser, as the water will then be warmer than that entering the refrigerator. However, this is not necessary, as I have found that ordinary tap water is sufficiently warm in practically all climates to furnish a sufficient amount of heat to cause the ice or frost to loosen and fall from the surrounding jacket.

Where it is not desired to make connections between the space and a running supply of water, the refrigerator may be provided with means whereby water may be poured into the space surrounding the chilling unit. Suitable stop cocks may be provided whereby the flow of water may be controlled and the water either retained within the space for a length of time sufficient to permit its heat being imparted to the surrounding mantle, or else allowed to continuously flow through the space. Where stop cocks are provided, the drain cock will be connected to the space near the bottom thereof, so that all of the water may be drained from said space.

Water is only one of several mediums which may be used to furnish the heat for de-frosting, and when desired, a suitable circulation of air through the space surrounding the chilling unit may be provided. Likewise, an electrical heater may be either arranged in the space between the jacket and chilling unit, or embedded in the surrounding jacket so that when a current passes therethrough, the space or jacket will be heated sufficiently and cause the removal of the ice and frost.

By removing the frost or ice in accordance with the present invention, the disadvantages attending the present methods of de-frosting and de-icing mechanical refrigerators are entirely eliminated and the operation much more satisfactorily and more quickly performed.

The invention is further illustrated and described in connection with the accompanying drawing, but it is to be understood this further illustration and description is by way of exemplification and the invention is not limited thereto except as is specifically set forth in the appended claims.

In the drawing, Fig. 1 represents a cross-sectional view through a portion of a refrigerator, showing one means for de-frosting the surrounding jacket;

Fig. 2 is a view similar to Fig. 1 showing a modification.

In the drawing, the upper portion of the refrigerator 1 contains a cooling unit 2 which performs the dual function of freezing cubes of ice, and reducing the temperature of the refrigerator to the desired degree. The cooling unit is provided with cold radiating fins 3, as is customary in such units. Surrounding the cooling unit and the fins 3 is a jacket or mantle 4, which forms a space 5 between it and the cooling unit. Inasmuch as the jacket or mantle 4 surrounds the chilling unit at all times, it should be in good heat and cold conducting contact with the chilling unit or its heat radiating fins 3, so that it will not materially retard the radiation of cold from the chilling unit. The fins 3 either terminate short of the edges of the unit 2, or else have passages therethrough so that the heating fluid is free to circulate around them.

The space 5 between the jacket 4 and the chilling unit 3 communicates with a fluid inlet 6, which is controlled by a valve 7, having an operating handle 8 extending to the outside of the refrigerator. A similar connection is made at the lower portion of the space 5 with an outlet 9, which is controlled by valve 10, having its operating handle 11 extending to the outside of the refrigerator. The valve 10 is suitably connected to a discharge 12, whereby a heating medium introduced through the inlet 6 may be drained from the space 5.

In Fig. 2, the mantle or jacket $4^a$ is shown as comprising a coil $4^a$ which follows the shape or contour of the cooling unit 2. This coil is connected with an inlet controllable by a valve 7, an outlet controllable by a valve 10 similar to that disclosed in Fig. 1.

When it is desired to de-frost the refrigerator, it is only necessary that a suitable heat supplying medium be introduced into the space 5 through the inlet pipe 6. When the heating medium enters the space 5, heat therefrom will be immediately imparted to the inside of the jacket 4, or coil $4^a$, as the case may be. This causes the frost or ice on the jacket to loosen so that it will fall off into the catch-pan located therebelow. The inlet may be connected to any source of water supply, as for example, a tap or faucet or a source of supply already present in the refrigerator, if it should be one of the gas type. However, it is not necessary that the inlet 6 be connected with a flowing source of water, as when desired, water may merely be poured into the inlet 6. If inlet 6 is connected to a flowing supply of water, both valves 7 and 10 may be maintained open, so that there will be a continuous flow of water through the space 5, as this will cause the most rapid removal of the frost or ice from the jacket 4 or coil $4^a$. However, this is not necessary, and if the inlet is not connected to a flowing supply of water, the valve 10 may be closed, and the space 5 filled with water, which is allowed to remain until sufficient heat has been imparted to the jacket 4 or coil $4^a$ to cause the frost or ice to be loosened therefrom, after which the valve 10 may be opened and the water allowed to drain through the outlet 12.

Although water has been referred to as the means for imparting the necessary heat to the surrounding jacket, it will be apparent that any other circulating fluid will perform a similar function, and, if desired, the valves 7 and 10 may be opened and warm air forced into the space 5 to heat up the surrounding jacket. Likewise, an electrical heater may be located in the space 5 or embedded in the surrounding jacket 4 or coil 4ª, so that when electricity flows therethrough, the jacket will be heated sufficiently to cause the frost or ice to become loosened.

From the foregoing, it will be apparent that the present invention provides means whereby a refrigerator may be very quickly de-frosted and in which it is not even necessary that the refrigeration be discontinued. This is an important advantage over prior ways of de-frosting refrigerators as it provides for the maintenance at all times of a supply of ice cubes for domestic uses. Heretofore, when the refrigerators were de-frosted, the ice cubes melted and the trays thereafter had to be emptied and refilled as the water resulting from the melting of the ice would absorb flavors from the foods in the food compartment, which if the water was not changed after de-frosting, would remain and impart an objectionable flavor to the re-frozen ice cubes. Moreover, my improved means for de-frosting the refrigerator is not accompanied by the disadvantages heretofore encountered and specifically referred to above.

What I claim is:

1. In a mechanical refrigerator having a food compartment and refrigerating mechanism including a chilling unit for lowering the temperature of said compartment, said chilling unit having a chamber in which water may be frozen, means for passing a heating medium through said chilling unit to de-frost the same while maintaining water in said water-freezing chamber frozen.

2. In a mechanical refrigerator having a food compartment and refrigerating mechanism including a chilling unit for lowering the temperature of said compartment, said chilling unit having a chamber in which water may be frozen, and means for heating the exterior surface of said chilling unit to de-frost the same while maintaining water in said water-freezing chamber frozen.

3. A method of de-frosting a mechanical refrigerator having a food compartment and refrigerating mechanism including a chilling unit having a chamber in which water may be frozen, which comprises warming the surface of said chilling unit on which frost accumulates while maintaining water in said water-freezing chamber frozen.

4. A method of de-frosting a mechanical refrigerator having a food compartment and refrigerating mechanism including a chilling unit having a chamber in which water may be frozen, which comprises passing a heating fluid through that portion of the chilling unit on which frost accumulates while maintaining water in said water-freezing chamber frozen.

5. In a mechanical refrigerator having a food compartment, a chilling unit for lowering the temperature of said compartment having an outer jacket in cold conducting relation to the chilling portion thereof, and means whereby heat may be imparted to the outside of said jacket from the interior thereof.

6. In a mechanical refrigerator having a food compartment, a chilling unit for lowering the temperature of said compartment having an outer jacket in cold conducting relation to the chilling portion thereof, and means whereby heat-conducting fluid may be passed through said jacket.

7. In a mechanical refrigerator having a food compartment, a chilling unit for lowering the temperature of said compartment having an outer jacket in cold conducting relation to the chilling portion thereof, and means whereby water may be passed through the space between said jacket and said chilling unit.

8. In a mechanical refrigerator having a food compartment, a chilling unit for lowering the temperature of said compartment having an outer jacket in cold conducting relation to the chilling portion thereof, and means whereby a gas may be passed through the space between said jacket and said chilling unit.

9. In a mechanical refrigerator having a food compartment, a chilling unit for lowering the temperature of said compartment having an outer jacket in cold conducting relation to the chilling portion thereof, a fluid inlet communicating with said jacket and an outlet communicating with the bottom of the jacket whereby a heat conducting fluid may be passed through said jacket.

10. In a mechanical refrigerator having a food compartment, a chilling unit for lowering the temperature of said compartment having an outer jacket, said outer jacket being formed by an external casing spaced from the chilling portion of the unit, cold radiating fins extending from the chilling portion of the unit and being in cold conducting relation with the external casing, and means whereby a heat conducting fluid may be passed through said jacket.

11. In a mechanical refrigerator having a food compartment, a chilling unit for lowering the temperature of said compartment, said chilling unit comprising a chamber in which water may be frozen, and a coil through which a heating medium may be passed to cause a defrosting of said unit.

12. In a mechanical refrigerator having a food compartment, a chilling unit for lowering the temperature of said compartment, said chilling unit comprising a chamber in which water may be frozen and an exterior coil in cold conducting relation with the chilling portion thereof, and means for conducting a heating fluid through said coil to cause a defrosting of said unit.

NATHAN SULZBERGER.